(12) United States Patent  
Blake

(10) Patent No.: US 12,096,256 B2
(45) Date of Patent: Sep. 17, 2024

(54) IDENTIFYING ANOMALIES IN COMMUNICATIONS NETWORKS BY DEFINING REGIONS

(71) Applicant: SPATIALBUZZ LIMITED, Guildford (GB)

(72) Inventor: Andrew Blake, Guildford (GB)

(73) Assignee: SPATIALBUZZ LIMITED, Guildford (GB)

( * ) Notice: Subject to any disclaimer, the term of this patent is extended or adjusted under 35 U.S.C. 154(b) by 402 days.

(21) Appl. No.: 17/416,835

(22) PCT Filed: Dec. 18, 2019

(86) PCT No.: PCT/GB2019/053601
§ 371 (c)(1),
(2) Date: Jun. 21, 2021

(87) PCT Pub. No.: WO2020/128463
PCT Pub. Date: Jun. 25, 2020

(65) Prior Publication Data
US 2022/0078645 A1    Mar. 10, 2022

(30) Foreign Application Priority Data
Dec. 20, 2018    (GB) .................................... 1820852

(51) Int. Cl.
*H04W 24/08*    (2009.01)
*H04W 64/00*    (2009.01)

(52) U.S. Cl.
CPC ......... *H04W 24/08* (2013.01); *H04W 64/003* (2013.01)

(58) Field of Classification Search
CPC ... H04L 47/36; H04L 43/0894; H04L 5/0094; H04W 28/06; H04W 24/02; H04W 52/146; H04W 52/241
See application file for complete search history.

(56) References Cited

U.S. PATENT DOCUMENTS

| 6,188,894 B1 | 2/2001 | Clancy |
| 2005/0075074 A1* | 4/2005 | Benson ............. H04W 36/0088 455/67.11 |

(Continued)

FOREIGN PATENT DOCUMENTS

| CN | 108124279 A1 | 6/2018 |
| EP | 2852207 A1 | 3/2015 |

OTHER PUBLICATIONS

PCT International Search Report and Written Opinion of the International Searching Authority for PCT/GB2019/053601, dated Mar. 16, 2020, 19 pages.

(Continued)

*Primary Examiner* — Iqbal Zaidi
(74) *Attorney, Agent, or Firm* — Aikin & Gallant, LLP

(57) ABSTRACT

A method is provided for identifying an anomaly in a communications network, the communications network covering a geographical area. The method comprises defining a plurality of regions within the geographical area. A measurement of a network performance characteristic is received from a user equipment, UE, connected to the communications network. The measurement is associated with a geographical location. A region of the plurality of regions which contains the geographical location is identified, and it is determined that there is an anomaly in the communications network within the identified region.

20 Claims, 11 Drawing Sheets

(56) References Cited

U.S. PATENT DOCUMENTS

| | | |
|---|---|---|
| 2007/0243881 A1 | 10/2007 | Roskowski |
| 2009/0310501 A1 | 12/2009 | Catovic et al. |
| 2013/0053023 A1 | 2/2013 | Meredith et al. |
| 2017/0230850 A1 | 8/2017 | Blake et al. |
| 2017/0244777 A1* | 8/2017 | Ouyang ............... H04L 65/80 |
| 2018/0316412 A1* | 11/2018 | Senior ............... H04W 52/38 |

OTHER PUBLICATIONS

Combined Search and Examination Report issued in corresponding Great Britain Application No. 1820852.0 mailed May 31, 2019.

* cited by examiner

IDENTIFYING ANOMALIES IN COMMUNICATIONS NETWORKS BY DEFINING REGIONS

CROSS REFERENCE TO RELATED APPLICATION

The present application is a National Phase Entry of International Application No. PCT/GB2019/053601, entitled "IDENTIFYING ANOMALIES IN COMMUNICATIONS NETWORKS BY DEFINING REGIONS" and filed on Dec. 18, 2019, which claims priority to Great Britain Application No. 1820852.0, filed Dec. 20, 2018 and entitled "Identifying anomalies in communications networks by defining regions." both of which are incorporated by reference herein in their respective entireties.

FIELD OF THE INVENTION

This invention relates to methods of identifying an anomaly in a communications network, such as a cellular network.

BACKGROUND

It is common for anomalies or faults occur in communications networks, such as mobile networks. For example, hardware components in a base station of the communications network may fail, or systems which are connected to multiple base-stations may fail, such as a radio network controller (RNC). Such faults may result in the loss of operation of large sections of the network.

When such failures occur, it is important to identify them as quickly as possible, both to fix the problem and to inform users of the network of the situation and likely time until normal service is restored.

In other situations, poor service may occur as a result of congestion on the network, or overload of a particular network resource which may impact many other resources, for example problems with a transmission link impacting multiple base stations. Such situations can occur, for example, during rush hour at a busy train station or around the time of an irregular event, such as a sports match or music concert, at a particular location.

Alternatively a severe weather event may impact a specific network element, such as a microwave link, with a consequent knock-on effect on all resources connected to that network element.

Typically faults are diagnosed within communications networks either by a hardware alarm reporting a fault condition, or by one or more users of the network reporting to the network operator that they are experiencing reduced quality service.

However, it is possible for faults to occur within the communications network that are not identified by the network's own fault reporting systems. This can occur for example when the fault is not associated with an installed alarm (e.g. the fault is not a hardware go/no-go type failure). Software issues may also result in a poor service being provided, or a service failure at one or more locations/BTS sites, without a traditional alarm or fault management system being activated. Even if a fault is eventually identified by such conventional systems, the network problems may have existed for long enough to have a large impact on performance experienced by users of the network.

SUMMARY OF THE INVENTION

According to a first aspect of the invention there is provided a method of identifying an anomaly in a communications network, the method comprising:
 providing a first measurement of a network performance characteristic for the network, wherein the first measurement is associated with a measurement location and a first measurement time:
 receiving a second measurement of the network performance characteristic from a user equipment, UE, connected to the communications network, wherein the second measurement is associated with the measurement location and a second measurement time, the second measurement time later than the first measurement time;
 comparing the first measurement of the network performance characteristic to the second measurement of the performance characteristic;
 identifying a difference between the first measurement and the second measurement; and
 determining that there is an anomaly in the communications network based on the identified difference.

This method uses changes in a network performance characteristic to identify anomalies in the communications network. A trend indicative of a reduction in network performance may be identified from the difference between the measurements, and the anomaly identified based on this trend. Identified anomalies can be investigated to determine if there is a fault in the communications network. Thus rather than relying on a hardware alarm or users phoning in to report a problem, this method focuses on the actual performance of the network. This may allow faults to be detected earlier than would otherwise be possible, as reductions in performance can be used to identify developing faults before a network failure occurs. This may be particularly useful for early detection of gradually-developing faults, such as an antenna slowly shifting position because of a loose mechanical connection.

The first measurement may represent normal performance of the communications network. For example, it may have been measured at a first time when it was known that there were no faults in the network.

The measurements may for example be reported to the network by an application running on the user equipment. The measurements may be automatically taken and sent from the UE. The network performance characteristic may for example be a data rate, a data throughput rate, a signal strength (such as a mean signal strength, or received signal strength indication (RSSI)), a packet latency, or a packet error rate.

In some embodiments the first measurement time may be a time which corresponds to the second measurement time. For example, the second measurement time may be a similar, but later, time period to the first measurement time. For example, the first measurement time may be a particular day in a week, and the second measurement time may be that same day in a later week (e.g. both the first and second measurements are taken on a Monday). The first and second times may be similar time periods within a day. for example both covering a particularly busy period such as rush hour.

Such embodiments ensure that the comparison between the measurements is controlled for natural variations in network performance because of, for example, increased use at particular times of the day. Any identified difference is therefore likely to be associated with an anomaly in the network, rather than just transient conditions.

The first and second measurement times may be specific times, or time periods. For example, either of the first and second measurement times may cover the period of an hour, or of a day.

In some embodiments, determining that there is an anomaly may comprise determining if the difference between the first measurement and the second measurement exceeds a predetermined threshold.

In some embodiments, the method may comprise:
providing first measurements of a plurality of network performance characteristics, wherein each first measurement is associated with the measurement location and the first measurement time; and
receiving second measurements of the plurality of network performance characteristics, wherein each second measurement is associated with the measurement location and the second measurement time;
comparing the first measurement of each network performance characteristic to the corresponding second measurement of the respective network performance characteristic; and
identifying a difference between the first measurement of each network performance characteristic and the corresponding second measurement of the respective performance characteristic.

Such a parameter-by-parameter based comparison method allows a fuller picture of network performance to be analysed, making correct identification of anomalies more likely, and reducing the likelihood of false alarms.

In some such embodiments, the method may comprise comparing each identified difference to a respective threshold, and determining that there is an anomaly in the communications network if a predetermined proportion of identified differences exceed their respective threshold.

For example, each respective threshold may be relatively small (i.e. only a small change in that characteristic is required to exceed the threshold). If a large proportion of the measured characteristics exceed their respective thresholds, it is likely that an anomaly exists.

A second, larger, threshold may also be provided for each characteristic. If a difference in one characteristic exceeds its respective second, larger threshold, it may be determined that there is an anomaly even if other characteristics do not exceed their respective thresholds. In other words, if there is a large change in just one of the network performance characteristics, this alone may be taken to be indicative of a fault.

In some embodiments, the method may comprise determining a weighted sum of the identified differences, comparing the weighted sum to a combined threshold, and determining that there is an anomaly in the communications network if the weighted sum exceeds the combined threshold.

The weightings may for example be based upon the importance of a given network characteristic/metric to the overall perceived user experience on the network. For example, throughput is likely to be of greater importance than latency, to most users and hence may be given a greater weighting. The weightings may also depend upon what a given user is using the network for, at the time. For example, network latency may be a relatively low priority for most users, however gaming users may give this a very high priority (much higher than, say, voice quality, as they are not using voice at the time). Other measures may be consequential, for example, RSSI is not something a user is directly concerned with, however the consequences of a low RSSI are of concern to the user (e.g. lower data rates), and so may be given a high weighting by the network operator.

In some embodiments, the method may comprise:
receiving measurements of the network performance characteristic (or characteristics) from a plurality of UEs, wherein each measurement is associated with the measurement location; and
comparing the measurement of the network performance characteristic (or characteristics) of each UE to the first measurement of the (respective) network performance characteristic.

It may then be determined that there is an anomaly in the network if a predetermined number, or predetermined proportion of UEs exhibit a change in the performance characteristic that is indicative of reduced network performance. For example, a difference between the measurement for each UE and the first measurement may be compared to a threshold; if the threshold is exceeded then it is determined that there is an anomaly. Alternatively, the differences across all UEs may be averaged, and the average compared to a threshold.

In some such embodiments, the measurement from each of the plurality of UEs is associated with a respective measurement time that is later than the first measurement time.

In some embodiments, the measurement location is a nominal coverage area of a cellular site of the communications network. For example, the measurement location may be the area covered by a cell tower of the communications network.

In some embodiments, the measurement location may be a region comprising nominal coverage areas of a plurality of cellular sites of the communications network, such as a region defined using the method of the third aspect of this invention.

In some embodiments, the first measurement of the network performance characteristic may have been previously received from the or a UE. The first measurement may be stored in a memory associated with a network monitoring system of the network.

In some embodiments, the first measurement of the network performance characteristic may be an average of a plurality of previously-received measurements. The plurality of previously-received measurements may have been measured over a range of time, and/or may comprise measurements from multiple UEs.

In some embodiments, the first measurement of the network performance characteristic may be an estimate of the network performance characteristic when there is not an anomaly in the communications network. For example, the first measurement may be an output of a model of the communications network that is indicative of normal (i.e. no anomaly/no fault) network performance. The first measurement may otherwise be artificially determined, such as based on historical measurements from other communications systems or other regions of the communication system.

In some embodiments, the method may further comprise:
providing a third measurement of the network performance characteristic, wherein the third measurement is associated with the measurement location;
comparing the third measurement of the network performance characteristic to the first measurement and the second measurement of the network performance characteristic;
identifying differences between the network performance characteristics of the first measurement, second measurement, and third measurement;

determining that the identified differences are associated with a reduction in performance of the network over time; and determining that there is an anomaly in the communications network based on the determination of the reduction in performance of the network.

Any number of measurements may be compared (e.g. including a fourth, fifth, sixth etc. measurement of the network performance characteristic), to determine if there is a trend in changes in the performance of the network, which may indicate a fault.

According to a second aspect of the invention there is provided a network monitoring tool for fault monitoring in a communications network, the tool comprising memory and data processing means, wherein the data processing means is arranged to perform the method of any embodiment of the first aspect.

According to a third aspect of the invention there is provided a method of identifying an anomaly in a communications network, the communications network covering a geographical area, the method comprising:

defining a plurality of regions within the geographical area;

receiving a measurement of a network performance characteristic from a user equipment, UE, connected to the communications network, the measurement associated with a geographical location;

identifying a region of the plurality of regions which contains the geographical location; and determining that there is an anomaly in the communications network within the identified region.

In particular, determining that there is an anomaly in the communications network based on the identified difference may be based on the received measurement of the network performance characteristic.

Modern cellular communications networks tend to have an in-built ability to 'self-heal' in the event that they detect a performance issue in a part of the network. For example, if a particular base station is experiencing problems (which may be a genuine fault or may simply be a congestion issue), the network can recognise this and autonomously re-arrange the coverage foot prints of nearby base stations to alleviate the problems being experienced by the faulty or congested base-station. This ensures that UEs within the coverage area of the problematic base station are still able to use the network. The mechanisms available to do this include: remote electrical tilt (RET) antennas, the elevation pointing angles of which can be controlled remotely, or active antenna systems, where both azimuth and elevation pointing angles can be controlled remotely. The network can thus automatically and autonomously correct for performance issues, including the complete failure of a cell site, without necessarily recognising such a failure. Likewise, performance data can be assessed by the network operations or network maintenance teams employed by the network operator and manual interventions or coverage changes may be made to the network by members of this or these teams, using the mechanisms discussed above.

However, the use of automated or autonomous network reconfiguration tools may create a problem if anomalies or faults in the communications network are monitored by assessing network performance characteristics reported by UEs. A UE may not experience the drop in network performance that it would otherwise have done without the intervention of the 'self-healing' process. As a result, anomalies and faults may not be detected.

The method of the third aspect can avoid this problem. According to this method, regions, such as groups of cell sites, are defined. Network performance characteristics can then be monitored across a region to determine if there is an anomaly. For example, if there is a change in a network performance characteristic indicative of reduced network performance, it may be determined that there is an anomaly within the region. If the region has self-healed to correct for a fault in part of the region, this may lead to reduced network performance across the region as a whole, which can then be used to identify that there is a fault.

In some embodiments, determining that there is an anomaly in the communications network within the identified region may comprise identifying a change in the network performance characteristic relative to a previous measurement of the network performance characteristic. This may comprise performing the method of any embodiment of the first aspect of the invention.

The network performance characteristic may for example be a data rate, a data throughput rate, a signal strength (such as a mean signal strength, or received signal strength indication (RSSI)), a packet latency, or a packet error rate. The network performance characteristic may be a fault report or status checks sent by the user of the UE. In this case, an increase in the rate of receiving status checks or fault reports would indicate an anomaly in the network.

In some embodiments, each region of the plurality of regions may be shaped to approximately tessellate with adjacent regions of the plurality of regions.

Approximately tessellate may mean that overlap between regions is permitted, for example a predetermined proportion of the area of a region may be permitted to overlap with a neighbouring region. The predetermined proportion may for example be 5% or less, or 10% or less, or 15% or less, or 20% or less.

In some embodiments, each region of the plurality of regions may have a substantially hexagonal shape. A hexagonal shape may be particularly advantageous, as it allows tessellation, but points along the edge of the region are all approximately the same distance from the centre of the region, avoiding edge effects.

In some embodiments, each region of the plurality of regions may have a respective diagonal length (i.e. the distance from one corner of the hexagon to an opposite corner). A first region of the plurality of regions may have a diagonal length that is different to the diagonal length of an adjacent second region of the plurality of regions. In other words, different regions of the plurality of regions may have different sizes. This allows the region size to be tailored to the particular area, based for example on a density of cell sites or users within that region.

In some embodiments, defining a plurality of regions may comprise selecting a diagonal length for each region from a set of diagonal lengths, wherein the diagonal lengths of the set of diagonal lengths form a geometric series.

In other words, there may be a limited number of possible hexagonal sizes from which the regions are chosen. The possible sizes form a geometric series. This ensures that the region sizes can be selected to be appropriate for that region, whilst still ensuring that the regions sufficiently tessellate with each other.

In some such embodiments, the common ratio of the geometric series may be 2 (i.e. a subsequent term in the series is twice the term immediately preceding it), or may be 3, or 4, or 5, or any other value.

Adjacent regions may in some embodiments differ in size by no more than the common ratio.

In some embodiments, the communications network may comprise a plurality of cell sites, each cell site providing access to the communications network within a cell area. Defining the plurality of regions may comprise grouping cell areas of adjacent cell sites to form the regions. In particular, a cell site may be placed into a particular region if it is configured to compensate for failures in one or more other cell sites in that region.

In such embodiments, the regions may be defined independently of the positions of cell sites. In particular, the centre points of the regions may be uncorrelated with the grid of cell site locations. In other words, the positioning of the regions is not associated with the pattern of cell site locations.

In some embodiments, a size of each region may be selected based on the density of cell sites within the region. Alternatively, the size of each region may be based on the density of users of the communications network.

In some embodiments, defining the plurality of regions within the geographical area may comprise:
  determining cell site density at a plurality of locations in the geographical area;
  grouping locations of similar cell site density to form sub-areas of the geographical area;
  determining a region size for each sub-area based on the cell site density in that sub-area; and
  defining regions of the respective region size within each sub-area.

Grouping locations of similar cell site density may comprise determining ranges of cell density which will be considered similar. Two locations may be considered to have a similar cell site density if their respective densities do not differ by more than a predetermined proportion, such as 20% or 10%. Alternatively, cell site density bins may be defined, and each location in the coverage area placed into one of the bins based on its cell site density. Locations within the same bin are then grouped to form sub-areas.

In some embodiments, identifying a region of the plurality of regions which contains the geographical location may comprise: determining that the geographical location is contained in two or more regions; and selecting one of the two or more regions as the identified region. Selecting one of the two or more regions may comprise determining a priority associated with each region of the two or more regions, identifying a highest priority region of the two or more regions, and selecting the highest priority region as the identified region.

In some embodiments, identifying a region of the plurality of regions which contains the geographical location may comprise determining that the geographical location is contained in two or more regions, determining a priority associated with each region of the two or more regions, identifying a highest priority region of the two or more regions, and selecting the highest priority region as the identified region.

Such embodiments may ensure that locations lying within an overlap between two regions are assigned to the most relevant region.

In some embodiments, the priority associated with each region of the two or more regions may be determined based on the respective cell site density of that region. For example, the region with the higher cell density may be assigned a higher priority.

According to a fourth aspect of the invention there is provided a network monitoring tool for fault monitoring in a communications network, the tool comprising memory and data processing means, wherein the data processing means is arranged to perform the method of any embodiment of the third aspect.

BRIEF DESCRIPTION OF THE DRAWINGS

By way of example only, certain embodiments of the invention shall now be described by reference to the accompanying drawings, in which.

DETAILED DESCRIPTION

Figure 1:
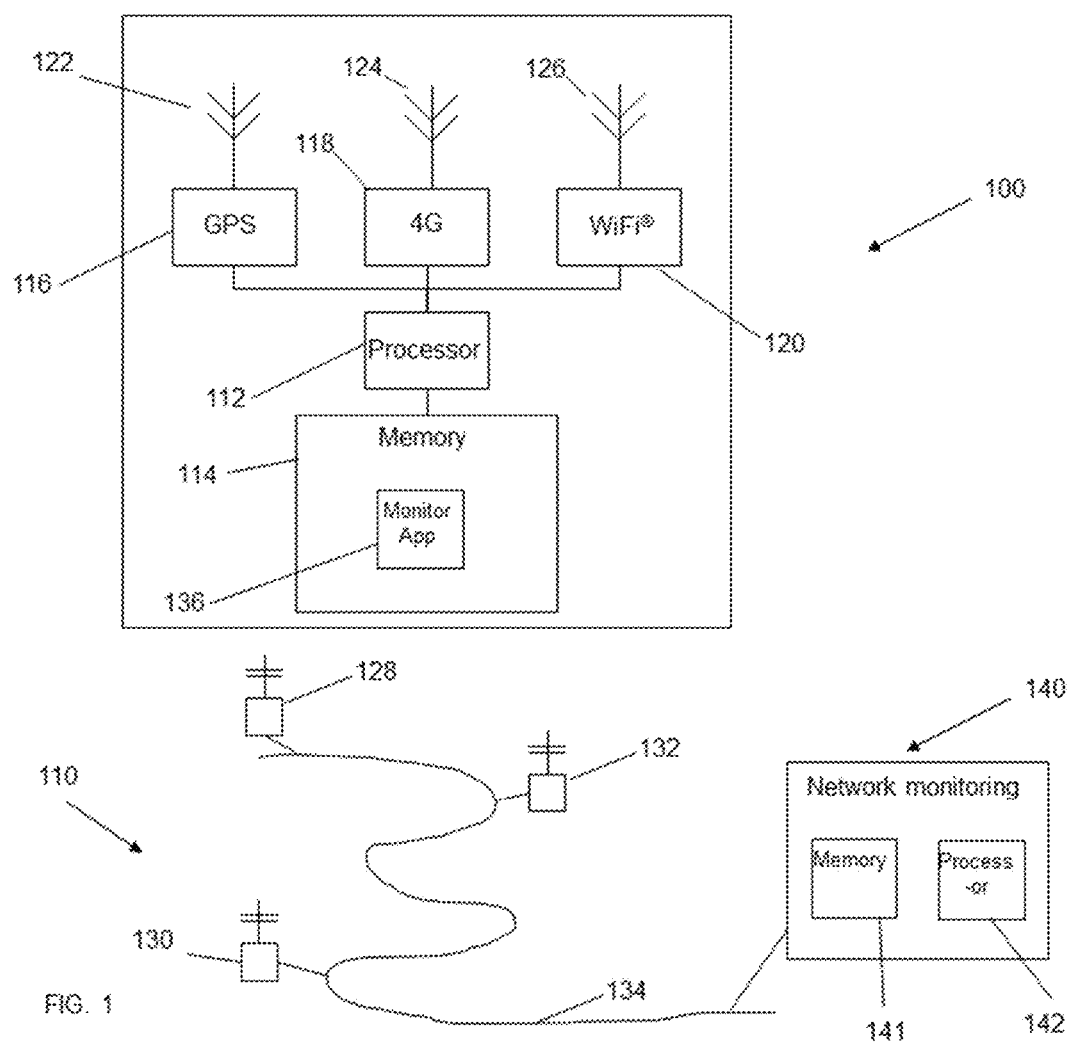
FIG. 1 is a schematic representation of a user equipment connected to a communications network.

FIG. 1 illustrates a user equipment (UE) 100 that is a mobile subscriber device—such as a smartphone, for example—that is operating in a cellular telecommunications network 110. The UE 100 comprises a processor 112, a memory 114, a GPS receiver 116, a cellular network transceiver 118, a Wi-Fi® transceiver 120 and three antennas 122-126. In practice, of course, the UE comprises many other elements besides, though description of these elements is not necessary to understand the invention as embodied by the devices and processes that are described by reference to the drawings. As shown, the cellular network 110 comprises a plurality of base stations 128, 130 and 132 that are interconnected by a backhaul infrastructure 134. For clarity, only three base stations are shown in FIG. 1, but the cellular network 110 may comprise any number of base stations.

The processor 112 has overall control of the UE 100 and executes instructions, with the aid of the storage provided by memory 114 to which the processor 112 is operatively coupled, in order to perform such tasks as may be required of the UE 100 by its user and by the operator of the network 110. The processor 112 is operatively coupled to the GPS receiver 116, the 4G transceiver 118, and the Wi-Fi® transceiver 120 in order to control and operate those subsystems. In order to perform their respective functions, the GPS receiver 116, the 4G transceiver 118, and the Wi-Fi® transceiver 120 are operatively coupled to antennas 122-126 respectively.

The GPS receiver 116 receives signals from overhead GPS satellites (not shown), mathematically estimates the location of the UE 100 from those signals, and reports the estimated location to the processor 112.

The cellular network transceiver 118 both transmits radio communications to, and receives radio communications from, the cellular communications network 110. The signals transmitted by the transceiver 118 may contain data generated by the user of the UE 100 and also signalling data—control information, measurement information and the like—that is utilised by the network 110 for the purpose of enabling the network 110 to at least adequately conduct radio communications with its users' UEs. Similarly, the signals received by the cellular network transceiver 118 may contain data intended for user consumption—voice-call data or video data, for example—as well as signalling data for enabling the UE 100 to interact efficiently with the network 110.

The Wi-Fi® transceiver 120 both transmits radio communications to, and receives radio communications from, Wi-Fi® access points (not shown) in the vicinity of the UE 100. The signals transmitted by the Wi-Fi® transceiver 120 may contain data generated by the user of the UE 100 and also signalling data that enables or facilitates communication between the Wi-Fi® transceiver 120 and one or more Wi-Fi® access points. Similarly, the signals received by the Wi-Fi® transceiver 120 may contain data intended for user consumption—voice-call data or video data, for example—as well as signalling data that enables or facilitates communication between the Wi-Fi® transceiver 120 and one or more Wi-Fi® access points.

The memory 114 contains programme code for execution by the processor 112 that constitutes a monitoring app 136 that, at least in part, performs measurements of network performance characteristics on the cellular network 110 for the benefit of the operator of the network 110. Such measurements may, for example, be of the following types.

The time it takes for round-trip communication from the UE 100 to a predetermined network or internet resource (not shown) via the network 110—a so-called latency measurement.

The rate at which user-type data can be transmitted to the network 110 from the UE 100.

The rate at which user-type data can be received from the network 110 by the UE 100.

The error rate in user-type data transmitted between the UE 100 and the network 110.

RSSI of signals received from a transmitter located at a cell site with which the UE is in communication.

The monitoring app 136 communicates the results of such measurements to the operator of the network 110 over the network 110 via the cellular network transceiver 118. It is useful 25 for the network operator to know the location in its network where a measurement was made, so that the operator can understand how different areas of its network are performing, and diagnose and remedy any underperformance. Therefore, the monitoring app 136 is configured to transmit each measurement with an indication of the location where the measurement was made, as well as an indication of the time each measurement was made and potentially also the primary application or applications which the UE was running at the time the measurement was made or during the period which the measurement covers.

The measurements provided by the UE are transmitted through the network 110 via the backhaul infrastructure 134 to a network monitoring system 140. The monitoring system 140 comprises a memory 141 for storing measurements from UEs 100 connected to the network 110, along with the location and time at which those measurements were taken. The network monitoring system further comprises a processor 142, which is configured to process the measurements to identify anomalies in the performance of the network 110, which may be indicative of a fault (or a developing fault).

Conventionally, a monitoring system of a network 110 may be configured to receive fault alarms from hardware of that network 110, such as hardware associated with a base station 128-130, or associated with the backhaul infrastructure 134. The network 110 may have been performing poorly for some time before such hardware alarms are activated. Other issues leading to poor network performance may not be detected by hardware alarms at all. Thus conventional monitoring systems can leave users of the network 100 suffering with poor network performance, without the network operator being aware.

In contrast, a monitoring system 140 according to the present invention uses changes in network performance, as determined from the measurements received from UEs 100, to identify problems as they develop. The network operator is then aware and can fix problems early on, rather than leave network users with worsening network performance.

Figure 2:
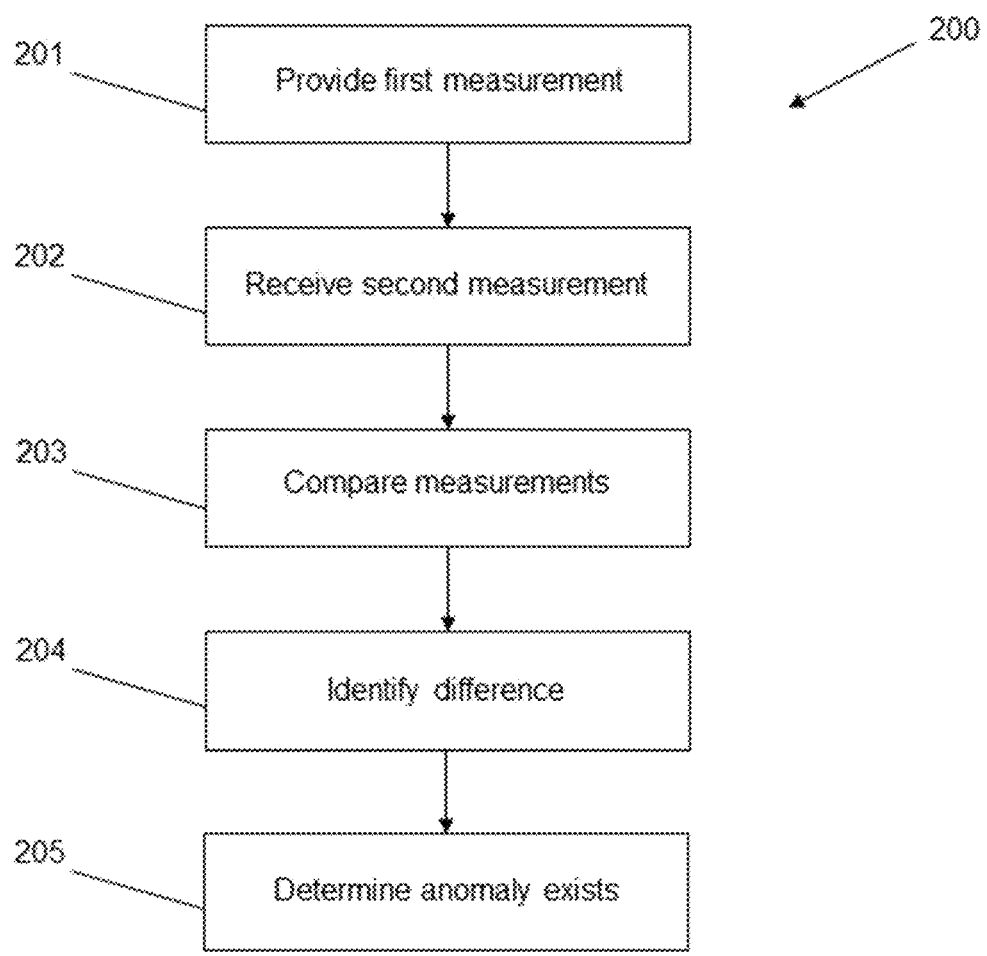
FIG. 2 illustrates a method of identifying an anomaly in the communications network.

FIG. 2 shows a method 200 of identifying an anomaly in a communications network 110, which the processor 142 of the monitoring system 140 may be configured to perform.

At step 201, a first measurement of a network performance characteristic for the network is provided. The first measurement is associated with a measurement location and a first measurement time. The first measurement may be retrieved from data storage, such as memory 141 of network monitoring system 140.

The first measurement may be a measurement provided by a UE 100, such as measurements taken by a measurement app 136 running on a UE 100, as described above. The data performance characteristic provides an indication of the performance of the network in the measurement location at the first time. The measurement location may particularly be an area, such as a coverage area of a base station of the network 110. The measurement time may be a time period—for example the first measurement may be associated with a particular day, or a particular hour during the day, rather than a specific time.

At step 202, a second measurement of the network performance characteristic is received from a UE 100 connected to the communications network 110. The second measurement is associated with the same measurement location (or measurement area) as the first measurement, but is taken at a later measurement time. The second measurement may be stored in the memory 141 before being processed according to the next steps of the method 200, or may be processed directly.

At step 203, the first measurement of the network performance characteristic is compared to the second measurement of the performance characteristic. This step compares measurements of the same characteristic, taken at different times.

At step 204, a difference between the first measurement and the second measurement is identified. In particular, a difference indicative of a reduction in network performance may be identified—i.e. the network performance characteristic is getting worse over time.

At step 205, it is determined that there is an anomaly in the communications network 110 based on the identified difference. The anomaly may then be investigated by the network operator to determine if there is a fault in the network 110 at the measurement location (or area), and if so steps can be taken to correct the fault.

The network performance characteristic may for example be a data rate; a data throughput rate; a signal strength, mean signal strength, RSSI (received signal strength indication) or similar; a packet latency; or a packet error rate or any other suitable metric.

Such network performance characteristics often vary. For example, when network usage in a location is particularly high, the network performance experienced by an individual UE 100 may be reduced. This reduced performance will be reflected in the measurements provided by the UE to the network monitoring system 140. If the second measurement in method 200 is taken at such a time, it may be wrongly assumed that there is a fault in the network 110. To avoid this, it is particularly advantageous to compare measurements taken at similar times. For example, the first and second measurements may be taken on the same day of the week (but in different weeks), or may both be taken in the same period of the day, such as rush hour. Both measurements may be taken on working days, or both on weekends. Both measurements may be taken on holiday days, or the same holiday day (e.g. Christmas day, a bank holiday etc.). Using such corresponding times for the measurements ensures that like-for-like measurements of the network performance characteristic are compared, minimising the effect of standard network performance variations.

The comparison of two measurements of the same network performance characteristic may be repeated for a number of different network performance characteristics, and/or for the network performance characteristic/s from a plurality of different UEs 100. In the latter case, first measurements from one UE 100 may be compared to second measurements of that same UE, or to second measurements of different UEs 100. A series of measurements of network performance characteristics, each taken at a different measurement time, may be compared to each other to determine if there is a trend in the change in network performance characteristic between measurements. If the trend is indicative of reduced network performance, it is determined that an anomaly exists.

Figure 3:
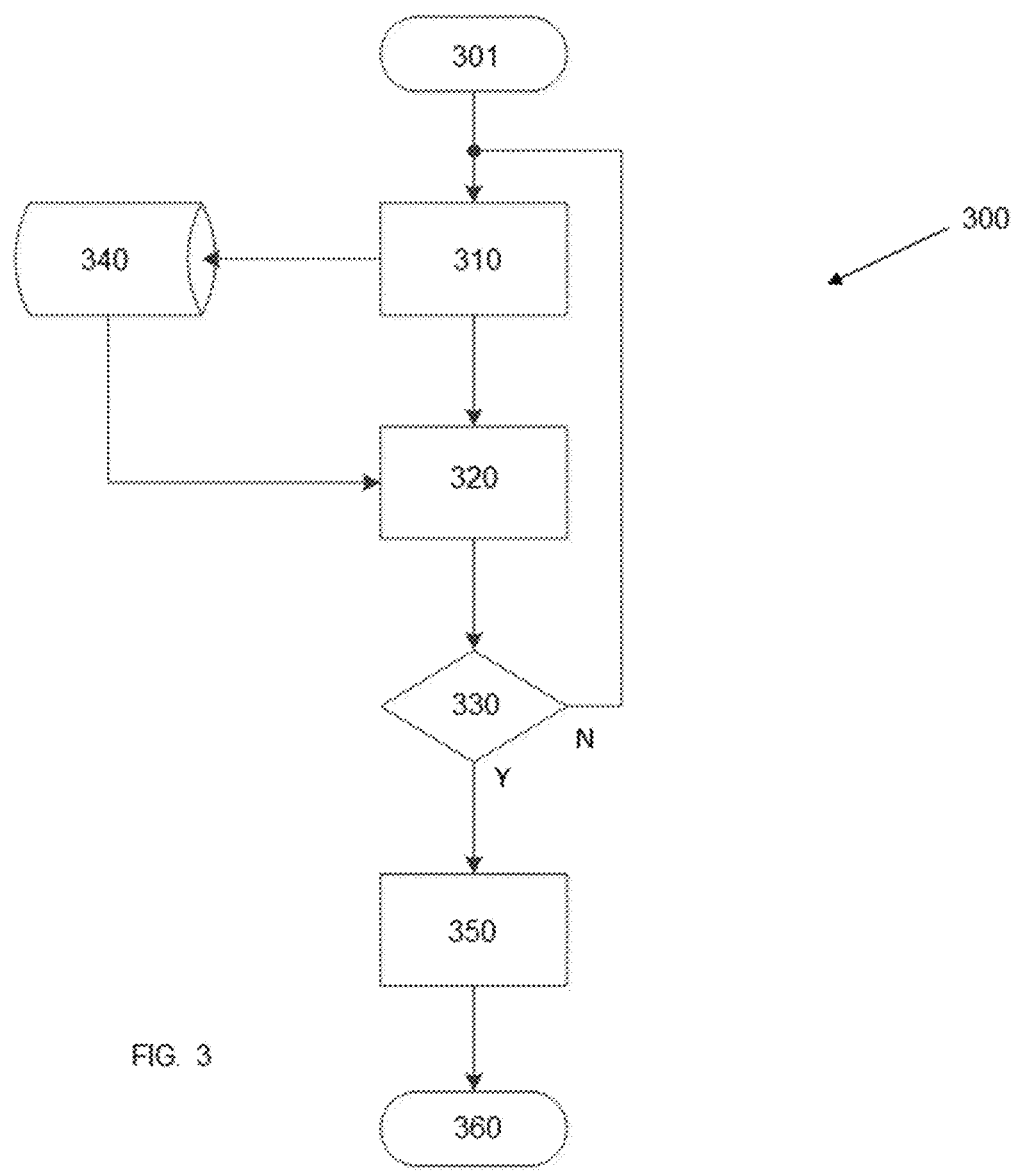
FIG. 3 illustrates an alternative method of identifying an anomaly in the communications network.

FIG. 3 illustrates a method 300 in which a plurality of network performance characteristics, as measured by a plurality of UEs 100, are used to identify anomalies in a network 110.

The method begins at step 301 and proceeds to step 310 in which measurement reports are received from a plurality of UEs 100, which may be geographically spread such that they are associated with a number of different cell sites/base stations (or perhaps all cell sites) across a network 100 (i.e. a number of different measurement locations). These measurement reports are stored in database 340 along with the cell ID of the cell site in which the measurements were taken and/or geospatial location at which the measurements were taken. In addition, a timestamp is added comprising the date and time each of the measurements were made.

The method then moves on to step 320 in which a newly-received measurement report (i.e. the second measurement) is compared with a prior measurement report or reports (i.e. the first measurement) from a similar time period in the recent past, and for the same measurement location (e.g. cell site ID). The comparison takes place on a parameter-by-parameter basis, comparing measurements of a plurality of network performance characteristics to earlier measurements of those network performance characteristics.

Either the first or second measurements may comprise a plurality of measurements recorded over time (either on the same UE 100 or different UEs 100), and averaged to provide a first or second measurement for the comparison.

A measure of the difference between each first measurement and respective second measurement is determined. For example a percentage difference or similar numeric difference measure may be calculated for each network performance characteristic. For example if the prior data rate, from the prior period, was 1000 kbits/sec and the recently measured data rate was 500 kbits/sec then the data rate could be calculated to have reduced by 50% between the prior and present periods. Such a large drop in data rate may indicate a possible fault with the network, particularly if repeated across a number of user devices and/or a large number of packets from a single user device, when communicating with a single cell site.

In some cases, a large change in one or more network performance characteristics may in itself indicate a major fault in the network 110. For example a drop in data rate from 1 Mbps to 1 kbps may be sufficient to trigger a fault-finding exercise without recourse to any other measurement parameters. For other parameters, e.g. RSSI, such a change may simply be an indication that a UE 100 has experienced blocking (e.g. due to the local presence of a large metallic object, such as a bus or van) and not necessarily an indication of a fault in the network 110. Assessing further parameters may therefore be necessary in such cases or taking a longer view of the parameter, or a view over a greater number of user devices located in a similar geographic position.

Thus in the next step 320 of method 300, a decision is made as to whether the comparison of the prior and newly-received measurement reports indicates an anomaly in the network 110. In particular, it is determined whether any of the following conditions are true:
 a) A change in a single network performance characteristic is greater than a predetermined threshold. This decision step may only apply to certain predetermined network performance characteristics, such as data rate, which are considered of critical importance to the performance of the network 110.
 b) A majority (or other predetermined proportion) of network performance characteristics have changed by amounts greater than their individual threshold values.
 c) A weighted sum of changes in a number of, or all, network performance characteristics is greater than a threshold value.

If the any of the conditions a)-c) are true, it is determined that there is an anomaly in the network 110. The anomaly is reported to a downstream application or system (e.g. network operations centre), in step 350. The method may then be re-run on a regular or continuous basis, i.e. the method may return to step 110. It is noted that in other embodiments, the determination may be based on only one of the conditions a)-c), or any combination of the conditions a)-c).

In methods 200 and 300, the first, prior measurements of network performance characteristics may be considered the 'normal' behaviour of the network 110 in that particular measurement location (e.g. within the coverage area of a particular cell site). However, for locations that are rarely used, there may not be enough prior measurements of network performance characteristics to know what normal behaviour is. In such locations, an initial 'monitor only' mode may be used before the method 200 or method 300 is performed. In this monitor only mode, a plurality of measurements of one or more network performance characteristics may be received, from one or more UEs 100. These measurements may then be analysed to determine a 'normal' value for each network performance characteristic, which can be used as the first measurement in method 200 or 300. For example the measurements for each network performance characteristic received in the monitor-only period may be averaged to provide a first measurement for that network performance characteristic.

Once the number of measurements from a location reaches an acceptability threshold, the location may be flagged as suitable for anomaly detection purposes, and the method 200 or 300 may be performed.

In alternative embodiments, the first measurement for a particular measurement location may be estimated or modelled. For example, a value for a network performance characteristic at a particular location (e.g. at a cell site) may be estimated based on previous performance in similar locations. The estimated value may represent the expected or ideal behaviour of the network performance characteristic.

It is noted that the first, prior measurements do not need to be considered 'normal' behaviour for the method of the present invention to be followed. All that is required is for a degradation in network performance between the first and second measurements to be identified. The first measurement may represent network performance that had already been reduced from normal, peak behaviour, for example due to a known (and tolerated) long-term issue at that particular location or in that area. An example of this may be the construction of a building or a temporary structure subsequent to the planning and installation of the communications network in that geographic area or region.

In any of the embodiments described above, measurement reports received from UEs 100 (either for the first or second measurements) may additionally comprise information on the usage of the UE 100 at the time the measurements were taken. For example, information on the app or apps running on the UE 100 at the time the measurement was taken may be sent to the network monitoring system 140. The network performance experienced by the UE 100 may be affected by the usage of the UE 100. For example, if an app that uses data heavily (e.g. a video player) is running, the monitoring app 136 may record reduced network performance. This usage information may be taken into account when comparing the first and second measurements in methods 200 and 300. For example, first and second measurements taken by UEs having similar usage profiles (e.g. the same or similar apps running) may be compared; or measurements from a UE with a heavy data usage app running at the time may be excluded from the comparison.

The above discussion has concentrated on the use of cell IDs as a mechanism for grouping reports and analysing their impact. In an alternative method, measurement reports are associated with (preferably hexagonal) regions encompassing multiple cell IDs. The use of regions/hexagons in this way allows the impact of a poorly-performing cell-site to be assessed in terms of its impact upon adjacent cells (e.g. increasing their loading beyond that which they were originally planned to have, or altering their coverage to incorporate the coverage area of the poorly-performing, or failed, cell-site). A method of defining such hexagonal regions is detailed further below. A 'monitor-only' period may be used whilst sufficient measurements of network performance characteristics are recorded for newly defined/rarely used regions.

Using statistics by cell ID (as opposed to regions/hexagons) may allow an operator (using the methods described herein) to identify whether a cell has completely failed, or whether the cell's performance has simply degraded. Normal network optimisation can, however, result in traffic moving between cells, so such problems are not necessarily as bad as they might appear. By combing cell statistics with hexagon statistics it is possible to additionally identify whether a geographic area has become degraded overall. After all, it is the overall network performance that users of the network 110 are interested in; not whether a particular component of that network is functioning correctly.

Identifying anomalies in networks 110 by comparing measurements of network performance characteristics within regions, rather than cell sites, may be particularly useful in modern, self-healing networks 110. In such networks 110, if a particular base station 130 is experiencing problems (which may be a genuine fault or may simply be a congestion issue), the network 110 can recognise this and, autonomously, re-arrange the coverage foot prints of nearby base stations 128, 132 to help to alleviate the problems being experienced by the original base station 130. The mechanisms available to do this include: remote electrical tilt (RET) antennas, the elevation pointing angles of which can be controlled remotely; or active antenna systems, where both azimuth and elevation pointing angles can be controlled remotely. The network 110 can thus automatically and autonomously correct for performance issues, including the complete failure of a cell site, without necessarily recognising such a failure. In turn, measurements made by a UE 100 connected to a particular cell site would not necessarily result in such a failure being recognised by the network, since the UE 100 cannot, by definition, be connected to the failed site (hence providing no information about that site) and the information provided from an adjacent site to which the device is connected may not obviously indicate a problem, as a stand-alone measurement (since that site would be working).

Figure 4:
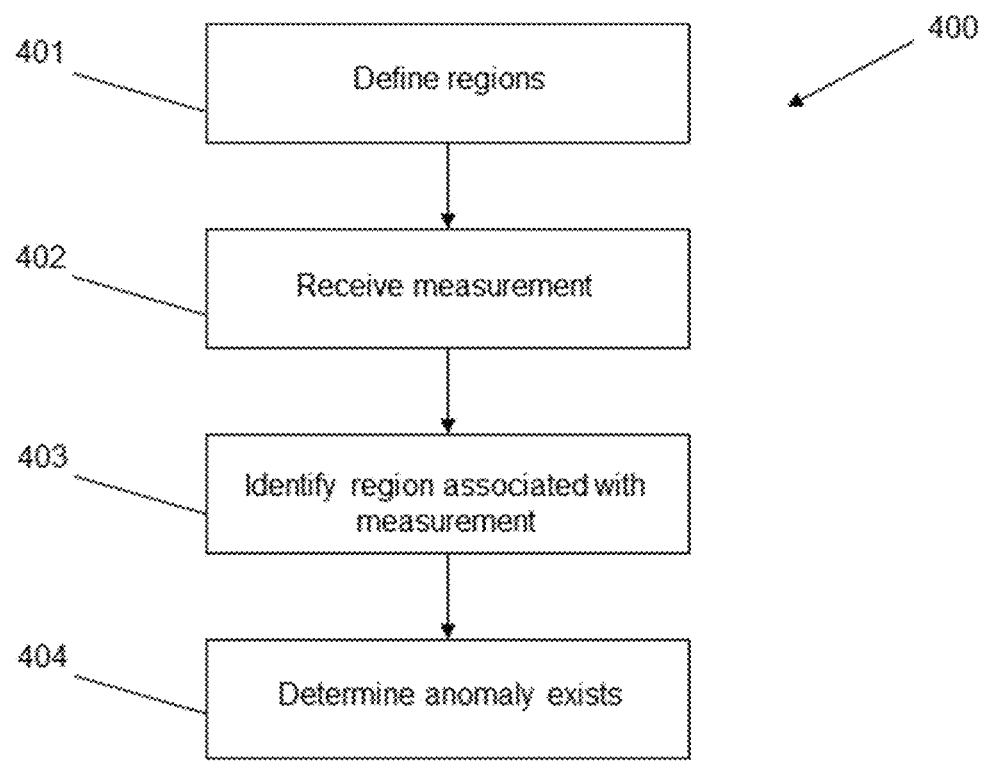
FIG. 4 illustrates a method of identifying anomalies by defining regions within the network.

FIG. 4 illustrates a method 400 of identifying an anomaly in a communications network 110, in which the network is divided into regions.

At step 401, a plurality of regions are defined within the geographical area covered by the network 110—i.e. the area within which UEs can connect to the network 100. Defining the regions is described in more detail below. The regions may be based on groupings of cell sites, of users of the network 110, or of received measurement reports.

At step 402, a measurement of a network performance characteristic is received from a UE 100 connected to the communications network 110. The measurement is associated with a geographical location. The measurement may be similar to the measurements described above. In particular, the measurement may be measured by a monitoring app 136 running on a UE 100. The network performance characteristic may for example be a data rate, a data throughput rate, a signal strength (such as a mean signal strength, or received signal strength indication (RSSI)), a packet latency, a packet error rate, or any other suitable metric. The network performance characteristic may be a fault report or status checks sent by the user of the UE 100. In this case, an increase in the rate of receiving status checks or fault reports would indicate an anomaly in the network.

At step 403, a region of the plurality of regions which contains the geographical location is identified.

At step 404, it is determined that there is an anomaly in the communications network within the identified region. Step 404 may comprise comparing the measurement to previous measurements of the network performance characteristic associated with the same region, from either the same UE 100 or other UEs 100 located in that region. For example, any embodiment of method 200 or 300 described above may be used. If the comparison identifies a degradation in network performance across the region, it is determined that an anomaly exists in the region. The anomaly can then be investigated to find and correct any faults (e.g. by looking at individual hardware alarms, or manual investigation). In this way, faults in individual cell sites can be identified based on changes in network performance, even in self-healing networks.

Note that measurement report/s may be proactively sought from UEs in a region, in particular those located within the nominal coverage area of a cell (located within the region) which is suspected to have failed. Likewise, if a particular region is seen to be experiencing problems (even though no specific cell site is yet suspected of having a problem), then reports may be proactively sought from users' devices which are located within that region.

A key advantage of this invention lies in its ability to group cell sites (or users or measurement reports) together, to form small regions, such that these small regions are appropriate for assessing the performance of a cellular network at a local level, despite the fact that cell site failures or localised performance issues may lead to the network automatically 'masking' (healing) such failures by reconfiguring coverage or capacity to compensate for the relevant shortcoming(s).

To enable this process to work particularly effectively, the cell sites to be grouped into a given region should preferably be sufficiently closely spaced that it is realistic for one or more of them to attempt to compensate for the partial or complete failure of a neighbour, within the small region. Equally, there should preferably be a sufficiently large number of cell sites within the small region that most or all sites which could compensate for a failure in a nearby site are included within the same region. This allows a meaningful assessment to be made of the likelihood of a failure in a particular site or a more general (or localised) congestion issue to be identified.

Preferably, the various regions should fit together as seamlessly as possible, so that no sites or areas of coverage are missed out by the system, and should also have a near-uniform radius from the centre of the region to eliminate 'edge effects'. Edge effects can occur if a poor choice of region shape is made, as will be described with reference to FIG. 5.

Figure 5A:
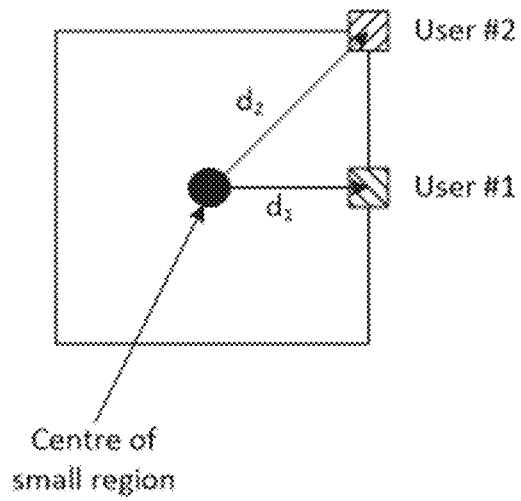
FIGS. 5(a) and 5(b) illustrate possible shapes for the regions.

Considering, first, FIG. 5(a), the square-shaped region would, at first sight, appear to be a good choice, since it will tessellate well, leaving no coverage gaps between adjacent regions. However, data supplied by user #2, located only just within the square coverage area, will correspond to measurements taken at a greater distance, d2, from the centre of the coverage area, than will data supplied by user #1, who is also located only just within the coverage area, at a distance d1 from its centre (where d1 is clearly much smaller than d2). If a network performance characteristic such as average RSSI is used to identify anomalies, then even in a correctly operating region (on average) an RSSI from user #2 would be lower than from user #1, leading to a non-uniformity in measured performance. A report from user #2 could therefore, wrongly, be taken as a symptom of a problem within the region as that UE 100 will report a lower than average RSSI simply due to its location within the region.

Figure 5B:
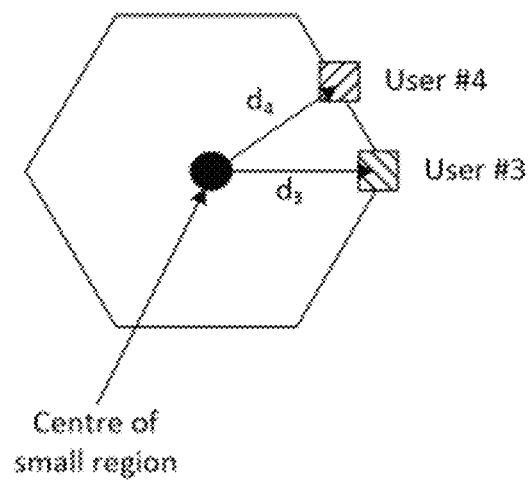

A preferable choice of region shape is shown in FIG. 5(b). This shape (a hexagon) also tessellates well, however it also substantially overcomes the problem of non-uniform distance. A user located along an edge of the region (e.g. user #4) is at a similar distance from the centre of the region as a user located at a vertex (e.g. user #3). Although a circle would be the optimum solution from the perspective of user distance, a circle would not tessellate. A hexagon provides an optimal comprise for providing regions which tessellate but which limit edge effects.

The size of the regions may reflect how dense the network 110 is in a particular geographic area. Hexagon size may therefore be based upon either or both of cell-site density in that area; and user density in the area. For example, a smaller region size may be used for regions with a higher cell-site density and/or higher user density than is used for lower cell-site/user density regions.

To ensure that hexagons of different sizes are able to sufficiently tessellate, a limited selection of hexagonal sizes may be provided. In particular, the 'radius' of the hexagon may be selected from a geometric series. Here 'radius' is used to represent the distance from the centre of a hexagon to a vertex—i.e. equivalent to the radius of a circle which approximates to the hexagon. Diagonal length means twice this 'radius'.

For example, eight different hexagon 'radii' may be chosen, with each having a factor of two difference in radius relative to its larger or smaller neighbour (i.e. the common ratio of the geometric series is 2). A set of radii may, for example, be: 0.5 km, 1 km, 2 km, 4 km, 8 km, 16 km, 32 km, 64 km, with the larger radii corresponding to rural areas and the smaller radii corresponding to dense urban environments. Other sizes, common ratios, and series lengths may be used.

Figure 6:
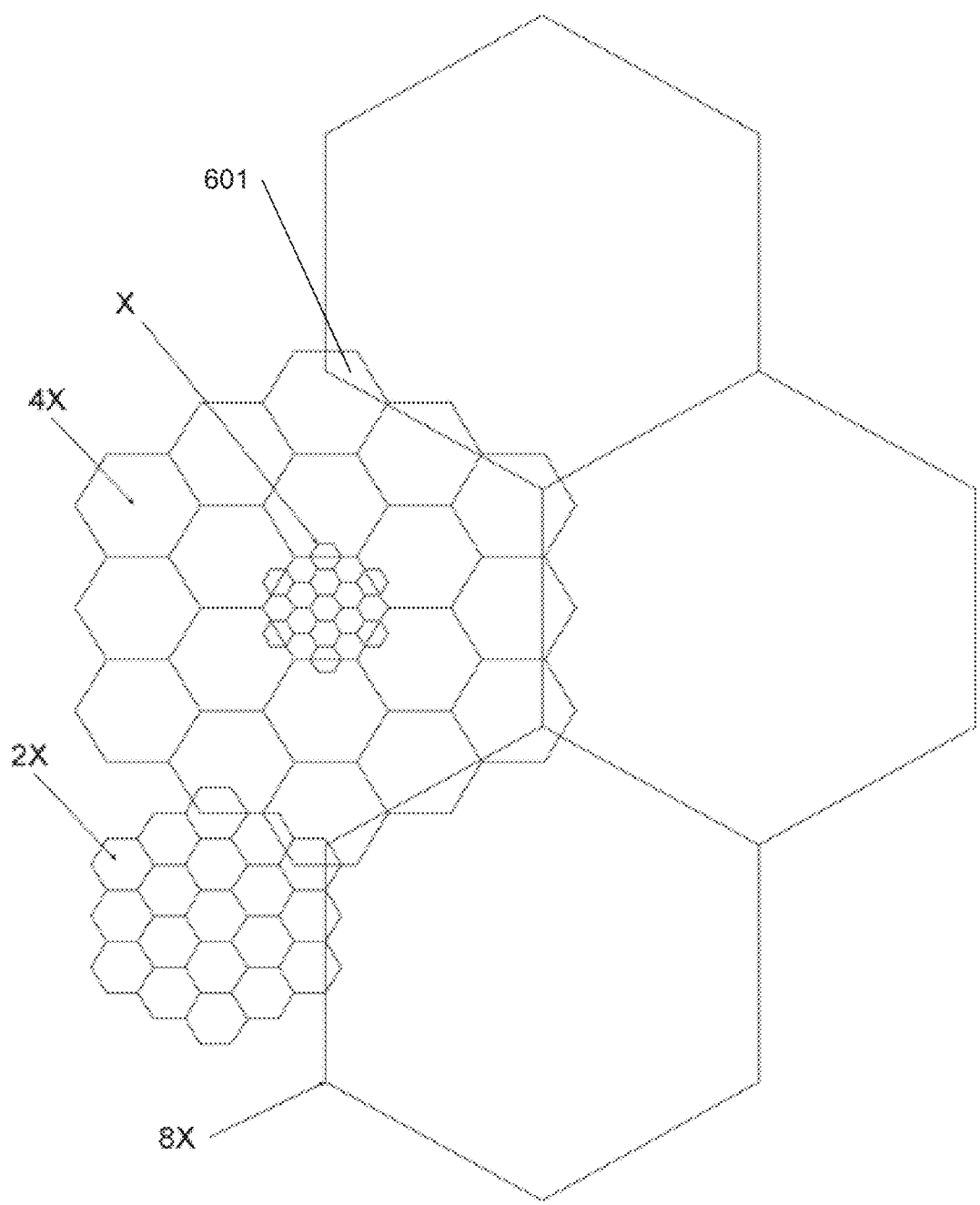
FIG. 6 illustrates an example area divided into a plurality of hexagonal regions.

FIG. 6 illustrates an example of an approximate tessellation of four different sizes of hexagonal regions, of radius: X, 2X, 4X and 8X. As can be seen in this figure, the tessellation of the regions may not be perfect. Some overlap between the defined regions may be allowed, particularly between differently sized regions. Overlap may for example be allowed as long as the area a region overlaps with other regions does not exceed 5% or 10% of the total area of that region (or other predetermined proportion). This approximate tessellation is adequate for the purpose of combining cell-sites and their coverage areas into appropriate groupings in order for meaningful diagnostic information to be obtained on their operation, on an on-going basis.

Certain geographical locations, such as point 601 in FIG. 6, may lie within two different defined regions. The step 403 in method 400 of determining which region a measurement is from may therefore comprise selecting one of multiple regions in which the location lies. The selection may be based on a priority associated with the possible regions. For example, each region may be assigned a priority level. The region with the highest priority level is then selected as the identified region in step 403. A region's priority level may be based on cell/user density within that region—for example with higher densities being assigned a higher priority level. Alternatively, if a particular region is of interest (for example because it is suspected that there is a fault in that region), a measurement may be identified as originating from that region even if there are alternative regions possible.

Figure 7:
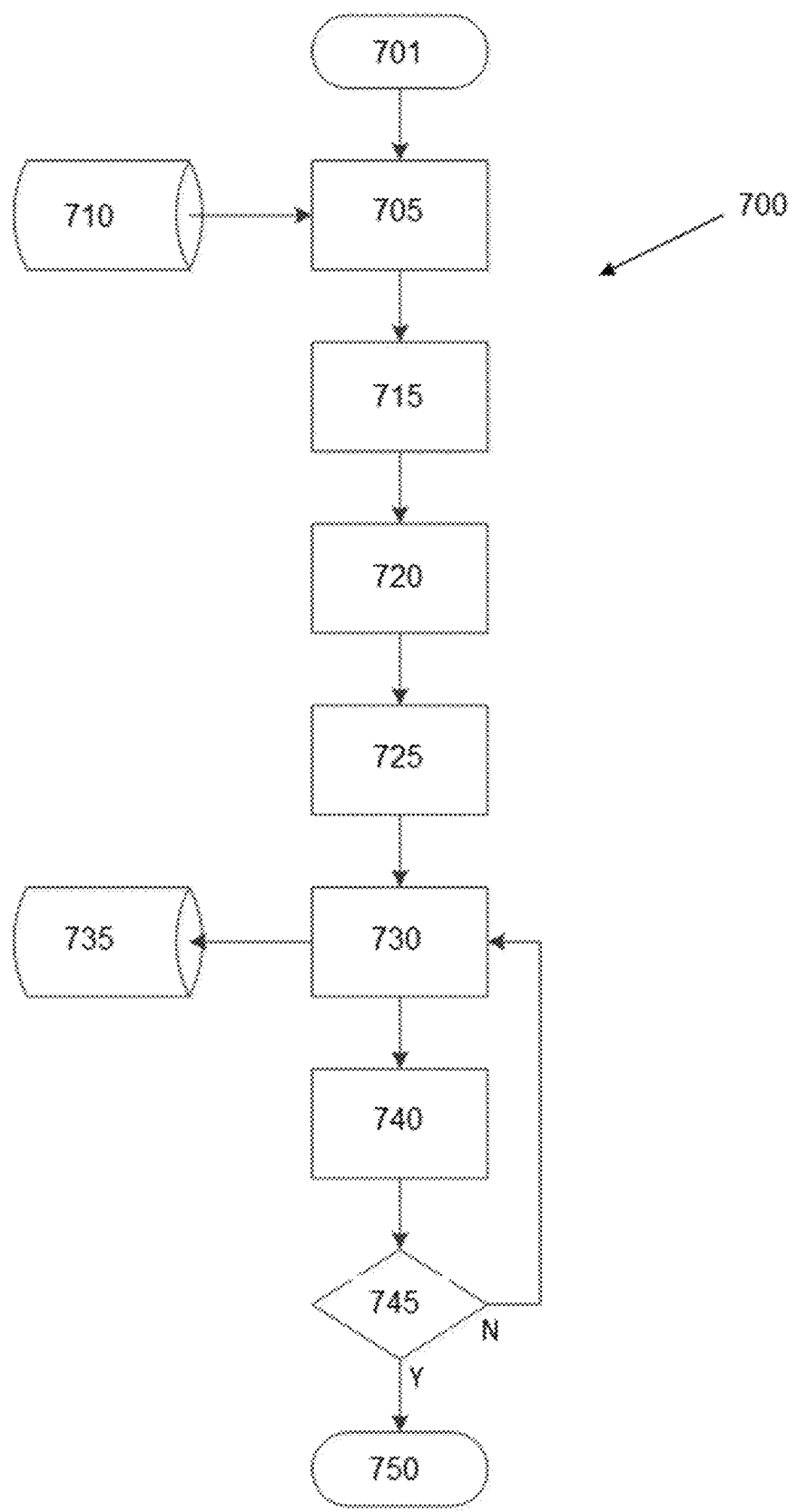
FIG. 7 illustrates a method of defining the regions.
Figure 8A:
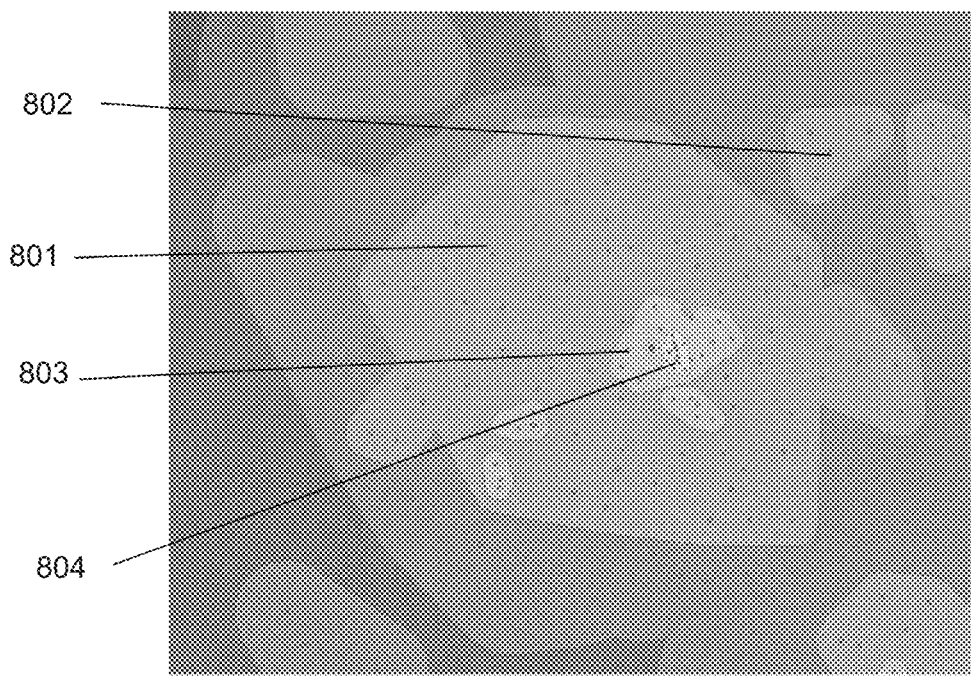
FIGS. 8(a)-8(e) further illustrate the method of FIG. 7.
Figure 8B:
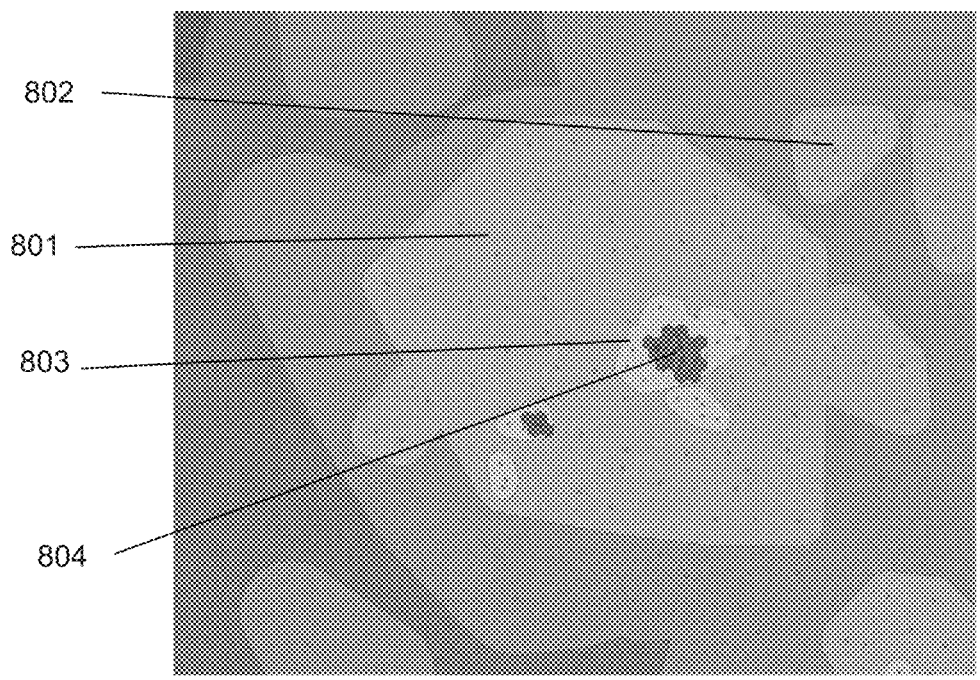
Figure 8C:
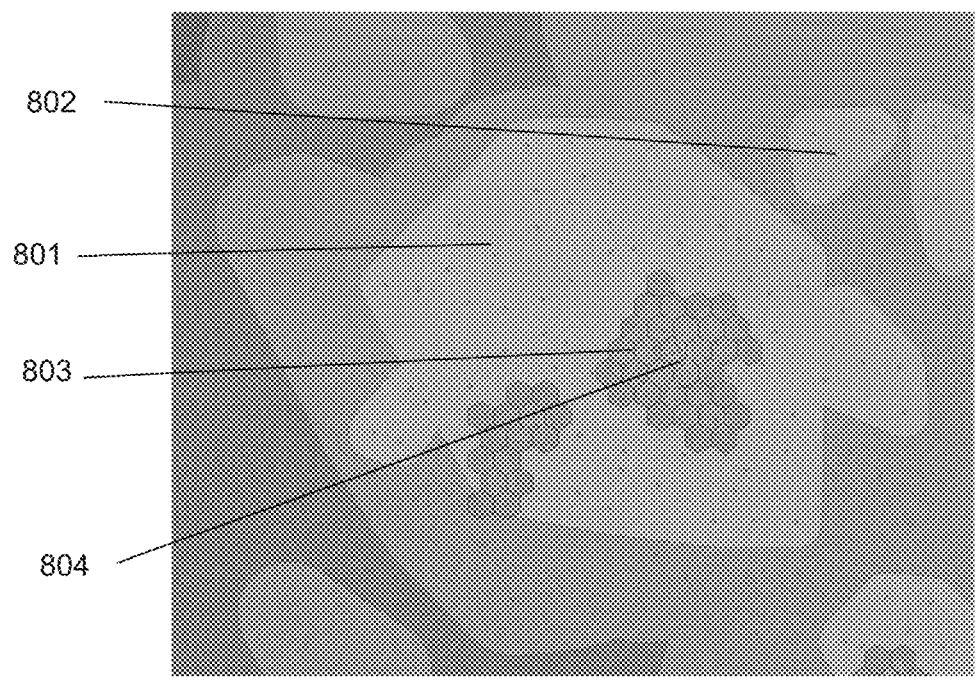
Figure 8D:
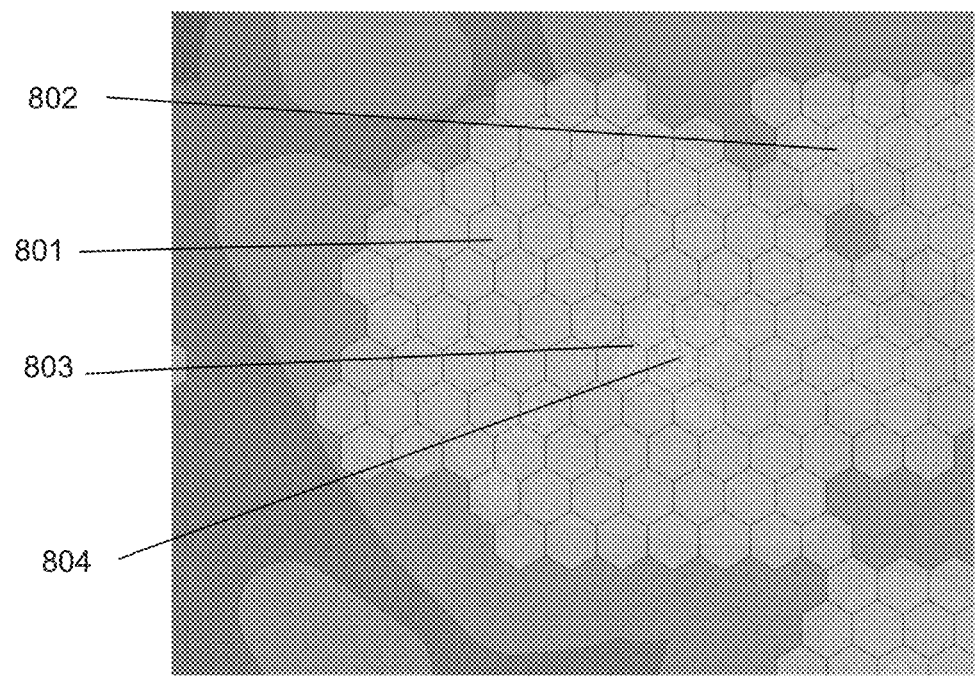
Figure 8E:
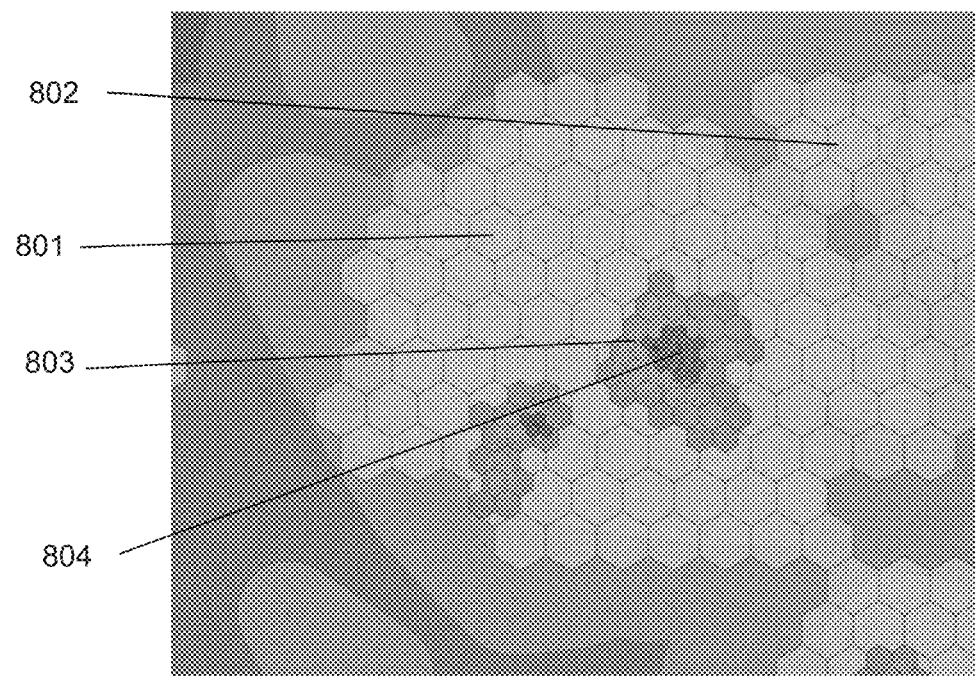

FIG. 7 illustrates a method 700 of defining regions within the geographical area covered by a communications network 110. In this case, regions are defined based on cell site density. Sub-areas of similar cell site density are defined, and those sub-areas are filled with hexagonal regions of a size selected for that cell site density.

The method begins at step 701 and then moves on to step 705 in which the cell site locations are obtained from a database 710, for example the network operator's planning tool database.

The method then moves on to step 715 in which boundaries between sub-areas of different cell site densities are determined. A plurality of cell site density bins may be defined, each bin encompassing a predetermined range of cell site densities. For example, the ranges of cell site density in the bins may be: <0.1 cells/sq. km in a first bin; 0.1 to 0.5 cells/sq. km in a second bin, 0.5 to 1 cells/sq. km in a third bin, and so on. The bin sizes and their respective sq. km ratios need not be equal. The bin that each location within the total coverage area falls into is then identified. Sub-areas are then defined by grouping locations according to their respective bins, and so boundaries between sub-areas can be identified.

The process then moves onto step 720, in which the bounded sub-areas are assigned a priority. The highest priority is given to sub-areas with to the highest site density (i.e. those containing locations within the highest density bin). Sub-areas with successively lower cell site densities are given successively lower priorities. The priorities of the sub-areas are represented by numbers, within "1" representing the highest priority and "N" representing the lowest priority, where N equals the number of cell site density bins.

At step 725 a counter variable. COUNT is initiated by being set equal to 1.

At step 730, all sub-areas which have a priority equal to COUNT are flood-filled with hexagonal regions of a size preselected for that priority/cell site density bin (e.g. for COUNT=1, the hexagon size might be 0.1 km radius and all regions which have a priority of '1' are flood filled with hexagons of radius 0.1 km). In addition, each cell site within the sub-area may be assigned to a hexagon which it lies within. This association, together with the assigned hexagon locations within the sub-area, are stored in database 735. The method then moves on to step 740 in which the counter variable COUNT is incremented.

In step 745 a test is performed to determine whether all sub-areas have been flooded with hexagons (determine whether COUNT>COUNT_MAX, where COUNT_MAX is numerically one greater than the number of priority region types, i.e. one greater than the range of hexagon sizes allowed). If all sub-areas have been flooded with hexagons, then the method ends at step 750. If not, then the method returns to step 730 in which regions with a priority equal to the new value of the variable COUNT are flood filled, with the process then continuing as described above.

The method 700 is further illustrated by FIGS. 8(*a*)-(*e*). FIG. 8(*a*) shows the boundaries between sub-areas of different cell site density. The different shades of grey in the figure represent different cell-site densities, with darker greys representing lower cell site densities. For example, sub-areas 801 and 802 belong to the same cell density bin, and so are assigned the same priority. Sub-area 803 has a cell site density in a higher bin than sub-areas 801 and 802, and so is assigned a higher priority. Sub-area 804 has a higher cell density still, and so is assigned the highest priority. For example, sub-area 804 may be given the priority level "1", sub-area 803 the priority level "2", and sub-areas 802 and 801 the priority level "3".

Once all of the sub-regions have been identified and assigned a priority, the regions are "flood-filled" with hexagonal regions. The process starts with sub-areas of the highest priority, which are filled with hexagons of the smallest size available (FIG. 8(*b*)). The remaining sub-areas are then flood filled in order of their priority, with hexagons of a size selected for their respective priority levels/cell site densities (FIGS. 8(*c*)-(*d*)). As can be seen in the figures, the hexagons may spread outside of their sub-area, to ensure that all of that sub-area is covered with hexagons. FIG. 8(*e*) shows the final overlay of all hexagonal regions. Where a location is covered by multiple regions, it is deemed to be in the region with the highest priority.

Figure 9:
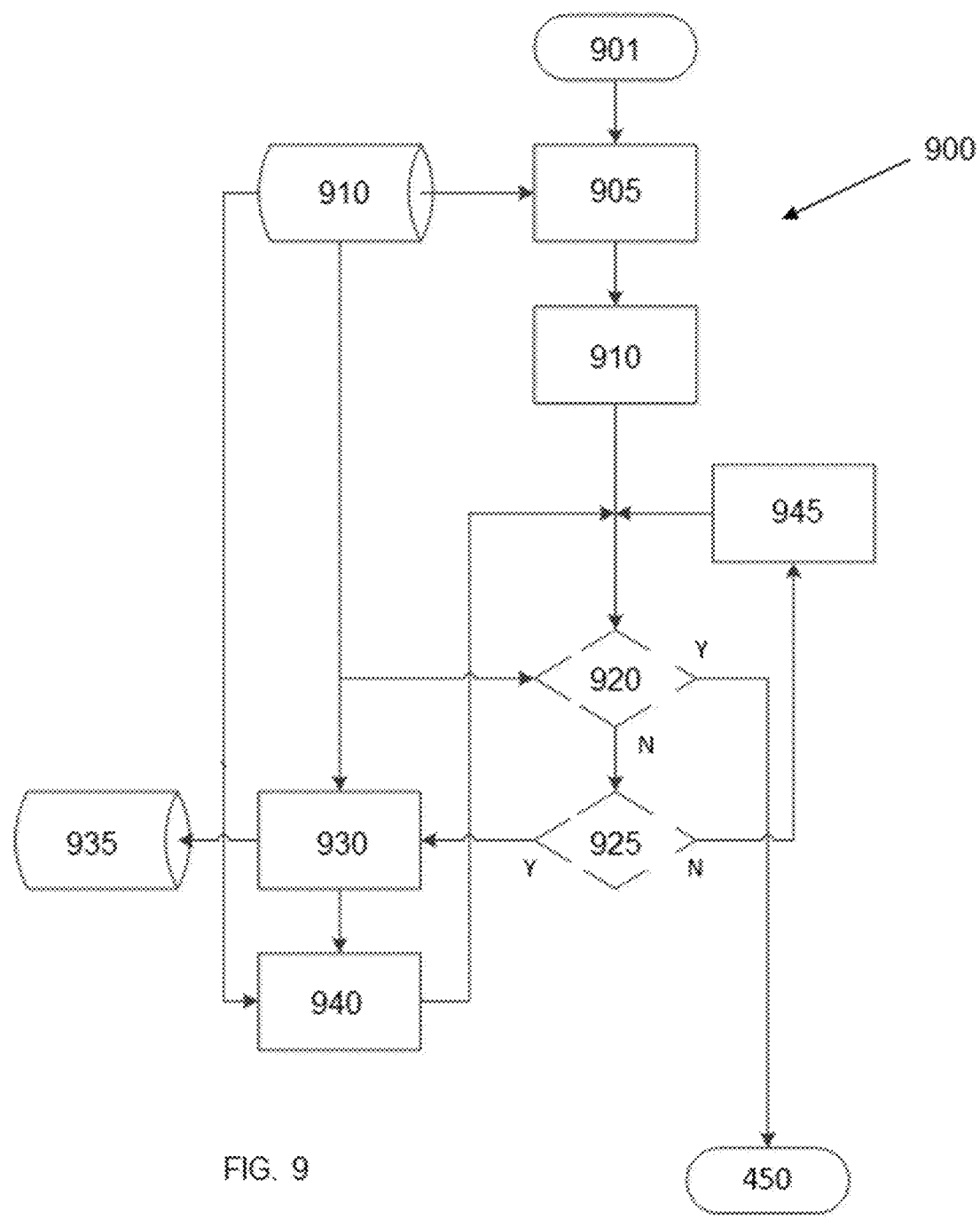
FIG. 9 illustrates a further method of defining regions.

FIG. 9 illustrates an alternative method 900 for determining the size and location hexagonal regions. The method begins at step 901 and proceeds to step 905 in which the locations of the various cell sites in an operator's network 110 are retrieved from database 910.

The method then moves to step 915 in which a geographic starting point for the process is chosen (forming the initial value for the 'assessment point' location parameter). For example the location of the operator's most south-westerly cell site may be chosen. The initial value for the region 'radius', R, is set to X km, corresponding to the smallest region which will be accommodated by the method and (corresponding to the highest cell site density). As an example, X may be 0.5 km. The method then moves on to step 920.

In step 920, a check is made to see if all of the cell sites have been assessed and included in a hexagonal region. The first time this test is encountered it will have a negative result and so the method moves on to step 925 in which the cell-site density in the vicinity of the assessment point is tested to see if it is greater than A cell-sites within a region of radius R. Here A is a predetermined number, for example A=10. If such a density is present, then the method moves on to step 930 in which the identities of the cell sites located within this hexagonal region are identified from the network planning tool database 910 and stored in the regions content database 935, along with the location and radius describing the hexagonal region.

The method then moves on to step 940 in which the location of the next-nearest cell-site to the current assessment point, which is not included in this first hexagonal region, is obtained from the network planning tool database 910. The method then returns to step 920 to determine if all cell-sites have now been included in a small region (i.e. if step 940 cannot find a cell-site which has not already been included in a grouping). If this is the case, then the method ends at step 950, if not it returns to step 925 to again check the cell density.

If, for illustrative purposes, it is assumed that the next cell site lies in a location where the cell density is lower than A cells within a region of radius R, then the method moves from step 925 to step 945 in which the region radius, R, is increased, for example being doubled (which in this example case would set R to 1 km).

The method then returns to step 920 in which it is determined if all cell-sites have now been included in a region, as discussed above, and the method continues to loop, as described above, until either all cell sites have been included within a region or an insufficient number of cell sites remains to meet the minimum grouping criteria (e.g. if fewer than A cell sites are present within a region of maximum radius). In such event, the remaining sites may be assigned to a lowest density/priority category/region.

Once the regions have been defined, for example using method 700 or 900 described above, they can be used to identify anomalies in the network 110. For example, the regions may be used to detect when a region (or group of regions) is receiving more status checks/fault reports from users in that region than normal. The regions may be used to validate that planned maintenance or unplanned fault fixes have been implemented correctly, by noticing that the status checks/performance characteristic measurements return to normal after the 'fix' time has passed.

Although the methods of defining regions above have been described in terms of cell sites, the regions may instead be used to group measurement reports; status checks; user feedback; or users. For example, the locations of measurement reports may be grouped into regions based on user density within that region, following an analogous method to method 700 or 900. Anomalies in network performance may then be assessed within the defined regions, to identify problems in the network 110.

Any of the methods described above may be performed by network monitoring system 140. In particular, the methods may be performed by processor 142 of monitoring system, 140. The methods may otherwise be implemented as algorithms or computer programs which may be run on a monitoring system associated with a network.

Although the invention has been described above with reference to one or more preferred embodiments, it will be appreciated that various changes or modifications may be made without departing from the scope of the invention as defined in the appended claims.

The invention claimed is:

1. A method of determining whether an anomaly indicative of a possible fault in a communications network exists, the communications network covering a geographical area, the method comprising:
defining a plurality of regions within the geographical area;
receiving a measurement of a network performance characteristic from a user equipment, UE, connected to the communications network, the measurement associated with a geographical location;
identifying a region of the plurality of regions which contains the geographical location; and
determining that an anomaly indicative of a possible fault in the communications network exists within the identified region by identifying a change in the measured network performance characteristic relative to a previously received measurement of the network performance characteristic.

2. The method of claim 1, wherein identifying a region of the plurality of regions which contains the geographical location comprises:
determining that the geographical location is contained in two or more regions; and
selecting one of the two or more regions as the identified region.

3. The method of claim 1, wherein each region of the plurality of regions is shaped to approximately tessellate with adjacent regions of the plurality of regions.

4. The method of claim 3, wherein each region of the plurality of regions has a hexagonal shape.

5. The method of claim 4, wherein each region of the plurality of regions has a respective diagonal length, and wherein a first region of the plurality of regions has a diagonal length that is different to the diagonal length of an adjacent second region of the plurality of regions.

6. The method of claim 5, wherein defining a plurality of regions comprises selecting a diagonal length for each region from a set of diagonal lengths, wherein the diagonal lengths of the set of diagonal lengths form a geometric series.

7. The method of claim 1, wherein the communications network comprises a plurality of cell sites, each cell site providing access to the communications network within a cell area, and wherein defining the plurality of regions comprises grouping cell areas of adjacent cell sites to form the regions.

8. The method of claim 7, wherein positions of the regions are independent of positions of cell sites.

9. The method of claim 7, wherein a size of each region is selected based on the density of cell sites within the region.

10. The method of claim 9, wherein defining the plurality of regions within the geographical area comprises:
determining cell site density at a plurality of locations in the geographical area;
grouping locations of similar cell site density to form sub-areas of the geographical area;
determining a respective region size for each sub-area based on the cell site density in that sub-area; and
defining regions of the respective region size within each sub-area.

11. The method of claim 1, wherein identifying a region of the plurality of regions which contains the geographical location comprises:
determining that the geographical location is contained in two or more regions;
determining a priority associated with each region of the two or more regions;
identifying a highest priority region of the two or more regions; and
selecting the highest priority region as the identified region.

12. The method of claim 11, wherein the priority associated with each region of the two or more regions is determined based on the respective cell site density of that region.

13. The method of claim 1, wherein a size of each region is selected based on a density of UE's within the region.

14. A network monitoring tool for fault monitoring in a communications network, the tool comprising memory and a processor configured by instructions stored in the memory to perform a method of determining whether an anomaly indicative of a possible fault in a communications network exists, the communications network covering a geographical area, the processor configured to:
define a plurality of regions within the geographical area;
receive a measurement of a network performance characteristic from a user equipment, UE, connected to the communications network, the measurement associated with a geographical location;
identify a region of the plurality of regions which contains the geographical location; and
determine that an anomaly indicative of a possible fault in the communications network exists within the identified region by identifying a change in the measured network performance characteristic relative to a previously received measurement of the network performance characteristic.

15. The method of claim 6, wherein the common ratio of the geometric series is 2.

16. A non-transitory machine-readable medium comprising instructions stored therein that, when accessed, configure a processor to:
define a plurality of regions within a geographical area covered by a communications network;
receive a measurement of a network performance characteristic from a user equipment, UE, connected to the communications network, the measurement associated with a geographical location;
identify a region of the plurality of regions, wherein the region contains the geographical location;
identify a change based on comparing the measured network performance characteristic with a previously received measurement of the network performance characteristic; and
based on the change, determine that an anomaly indicative of a fault in the communications network exists within the identified region.

17. The non-transitory machine-readable medium of claim 16 wherein the instructions stored therein, when accessed, configure the processor to identify the region which contains the geographical location by:
determining that the geographical location is contained in two or more regions; and
selecting one of the two or more regions as the identified region.

18. The non-transitory machine-readable medium of claim 16, wherein the communications network comprises a plurality of cell sites, each cell site providing access to the communications network within a cell area, and wherein defining the plurality of regions comprises grouping cell areas of adjacent cell sites to form the regions.

19. The non-transitory machine-readable medium of claim 18, wherein positions of the regions are independent of positions of cell sites.

20. The non-transitory machine-readable medium of claim 18, wherein a size of each region is selected based on the density of cell sites within the region.

* * * * *